United States Patent [19]
Dunmead et al.

[11] Patent Number: 5,710,382
[45] Date of Patent: Jan. 20, 1998

[54] ALUMINUM NITRIDE, ALUMINUM NITRIDE CONTAINING SOLID SOLUTIONS AND ALUMINUM NITRIDE COMPOSITES PREPARED BY COMBUSTION SYNTHESIS AND SINTERED BODIES PREPARED THEREFROM

[75] Inventors: Stephen D. Dunmead; William G. Moore; Kevin E. Howard, all of Midland, Mich.; Kevin C. Morse, Bolingbrook, Ill.; Theresa A. Guiton, Midland, Mich.

[73] Assignee: The Dow Chemical Company, Midland, Mich.

[21] Appl. No.: 593,310

[22] Filed: Jan. 31, 1996

Related U.S. Application Data

[63] Continuation-in-part of Ser. No. 532,729, Sep. 26, 1995, Pat. No. 5,649,278.

[51] Int. Cl.$^6$ .......................... C22C 29/14; C04B 35/58; B22F 3/00
[52] U.S. Cl. .................. 75/230; 75/244; 501/96; 428/550
[58] Field of Search ............... 75/230, 244; 501/96; 419/2, 5, 13; 428/550

[56] References Cited

U.S. PATENT DOCUMENTS

| | | | |
|---|---|---|---|
| 3,607,046 | 9/1971 | Little et al. | 23/192 |
| 3,726,643 | 4/1973 | Merzhanov et al. | 423/409 |
| 4,576,923 | 3/1986 | Broussaud et al. | 501/98 |
| 4,877,759 | 10/1989 | Holt et al. | 501/96 |
| 4,909,842 | 3/1990 | Dunmead et al. | 75/236 |
| 4,988,645 | 1/1991 | Holt et al. | 501/91 |
| 5,167,944 | 12/1992 | Uda et al. | 423/412 |

OTHER PUBLICATIONS

Dunmead et al., "Simultaneous Combustion Synthesis and Densification of AlN", *SHS And Densification of AlN*, Lawrence Livermore National Laboratory, pp. 186–194.

Dunmead et al., "Gas–Solid Reactions Under a Self–Propagating Combustion Mode", *Solid State Ionics*, 32/33 (1989) pp. 474–481.

Dunmead, et al., "Simultaneous synthesis and densification of TiC/Ni–Al composites", *Journal of Materials Science*, 26 (1991) pp. 2410–2416.

Holt et al., "Self–Heating Synthesis of Materials", *Annu. Rev. Mater. Sci.*, (1991) vol. 21, pp. 305–334.

Holt, "The Use of Exothermic Reactions in the Synthesis and Densification of Ceramic Materials", *MRS Bulletin*, Oct. 1/Nov. 15 (1987) pp. 60–64.

Yamada, et al., "Combustion Synthesis of Silicon Carbide in Nitrogen Atmosphere", *J. Am. Ceram. Soc.*, 72[9](1989) pp. 1735–1738.

Munir, "Synthesis of High Temperature Materials by Self–Propagating Combustion Methods", *Ceramic Bulletin*, vol. 67, No. 2, (1988) pp. 343–349.

Miyamoto, "New Ceramic Processing Approaches Using Combustion Synthesis Under Gas Pressure", *Ceramic Bulletin*, vol. 69, No. 4, (1990) pp. 686–690.

Munir, et al., "Self–Propagating Exothermic Reactions: The Synthesis of High–Temperature Materials by Combustion", *Materials Science Reports*, 3 (1989) pp. 227–365.

Hirao, et al. "Combustion Synthesis of Nitride Powders Under High Nitrogen Pressure", *Advances in Ceramics*, vol. 21: *Ceramic Powder Science*, pp. 289–300.

Prokudina, et al., "Production of Aluminum Nitride of the SHS Type and of Highly–Dense Ceramics Made From It", *Problems of Combustion Technology; Materials of the Third All–Union Conference on the Technology of Combustion*, 17–20, Nov. 1981.

*Primary Examiner*—Peter A. Nelson

[57] ABSTRACT

Aluminum nitride powder, aluminum nitride platelets, powdered solid solutions of aluminum nitride and at least one other ceramic material such as silicon carbide, and composites of aluminum nitride and transition metal borides or carbides are prepared by combustion synthesis at low gaseous nitrogen pressures. Porous bodies of aluminum nitride or composites of aluminum nitride and transition metal borides or carbides are also prepared by combustion synthesis at these pressures. The porous bodies are suitable for infiltration, either as formed or after being coated with at least one layer of a silicate material, by polymers or metals. The powders are also suitable for preparing dense sintered bodies. The aluminum nitride powder is also used to prepare AlN sintered bodies.

6 Claims, No Drawings

ALUMINUM NITRIDE, ALUMINUM NITRIDE CONTAINING SOLID SOLUTIONS AND ALUMINUM NITRIDE COMPOSITES PREPARED BY COMBUSTION SYNTHESIS AND SINTERED BODIES PREPARED THEREFROM

CROSS-REFERENCE TO RELATED APPLICATION

This application is a Continuation-in-Part of application Ser. No. 08/532,729, now U.S. Pat. No. 5,649,278, filed Sep. 26, 1995 (which corresponds to International Application No. PCT/US94/00925, filed Jan. 27, 1994).

BACKGROUND OF THE INVENTION

The present invention relates generally to combustion synthesis and its use in preparing aluminum nitride (AlN) as powder, platelets or porous bodies, solid solution powders or porous bodies of AlN and another ceramic material such as silicon carbide (SiC) or powdered composites or porous bodies of AlN and transition metal borides or carbides. The present invention also relates generally to polymer-ceramic composites and metal-ceramic composites prepared by infiltration, or another conventional technique, of the porous bodies, either as synthesized or as coated with a silicate material. The invention further relates to sintered bodies prepared from the powders described herein. In addition, the invention relates to sintered bodies prepared from the powders described herein. The present invention relates more particularly to combustion synthesis of said AlN powder, platelets, composites, porous bodies and solid solutions at gaseous nitrogen pressures of less than 30 atmospheres (3.0 MPa).

A variety of refractory ceramic materials including nitrides, carbides, borides, nitride-oxide and carbide-oxide composites are known to be produced by combustion synthesis of powder compacts. The process uses heat evolved during spontaneous chemical reactions between mixtures of solids, solids and liquids or solids and gases. A combustion wave is initiated by an ignition source and rapidly propagates through the compact. The key to self-propagating high temperature synthesis (SHS) is that once initiated, highly exothermic reactions become self-sustaining and propagate through a reactant mixture in the form of a combustion wave. As the combustion wave or front advances, reactants are converted to products. A major advantage of SHS as a process for synthesizing materials stems from energy savings associated with a self-sustaining reaction.

The combustion reaction is initiated by one of two procedures. In either procedure, the reactant mixture is usually cold-pressed, or otherwise formed, into a powder compact, typically cylindrical in shape, prior to initiation. One procedure heats a small region, normally an upper surface portion, of the powder compact with a heated tungsten coil, or other ignition source, to an ignition temperature. Following ignition of that region or portion, the combustion wave advances throughout the compact and leaves behind a desired reaction product. The other procedure heats the entire compact up to an ignition temperature whereupon combustion occurs in a substantially simultaneous manner throughout the compact in a thermal explosion.

U.S. Pat. No. 4,988,645 teaches, at column 1, lines 42–51, that solid-gas combustion synthesis reactions must take place under a gas pressure that equals or exceeds a desired product's dissociation pressure at the adiabatic combustion temperature. At column 1, lines 50–51, it teaches that some materials require high pressures and notes that AlN is formed at 14 MPa and silicon nitride ($Si_3N_4$) is formed at 50 MPa (500 atmospheres (atm)).

U.S. Pat. No. 4,877,759 teaches, at column 1, lines 30–48, the use of solid sources of nitrogen such as sodium azide ($NaN_3$) in combustion synthesis. It also teaches, at column 1, lines 45–48, that neither silicon (Si) nor aluminum (Al) can be combusted at one atm of nitrogen even if a solid source of nitrogen is present.

SUMMARY OF THE INVENTION

One aspect of the present invention is a method for preparing a product that is AlN, a composite of AlN and a transition metal boride or transition metal carbide, a solid solution of AlN and at least one other ceramic material by combustion synthesis comprising: a) igniting, in the presence of gaseous nitrogen at a pressure of from 0.75 to 30 atm (0.075 to 3 MPa), a particulate material that is (1) a metal selected from Al and Al alloys, optionally in admixture with an inert solid diluent, when producing AlN; or (2) a metal selected from Al and Al alloys in admixture with carbon when producing AlN platelets; or (3) a metal selected from Al and Al alloys in admixture with a combination of a first transition metal, a nonmetallic component selected from carbon and boron, and a second transition metal, the first and second transition metals being different metals selected from titanium (Ti), zirconium (Zr), hafnium (Hf), vanadium (V), niobium (Nb), tantalum (Ta), chromium (Cr), molybdenum (Mo) and tungsten (W), when producing composites of aluminum nitride and a transition metal boride or a transition metal carbide wherein the transition metal boride or carbide is in the form of whiskers; or (4) an admixture of a metal selected from Al and Al alloys and a ceramic material or ceramic material precursor selected from (i) at least one ceramic material selected from silicon carbide (SIC), aluminum oxide ($Al_2O_3$) and silica ($SiO_2$) or (ii) a combination of silicon nitride ($Si_3N_4$) and $Al_2O_3$, and, optionally, one or more of SiC and $SiO_2$, or (iii) a particulate combination of Si and carbon (C), when producing a solid solution, the particulate material having a bulk density and an Al metal content sufficient to establish and maintain a self-propagating combustion wave that passes through the admixture; and b) allowing the combustion wave to pass through substantially all of the admixture to convert at least 75 percent by weight (wt %) of the Al in the particulate material to AlN or an AlN solid solution, except when making AlN platelets, in which case at least 10 wt % of the Al in the particulate material converts into AlN.

A second aspect of the present invention is the AlN powder, AlN platelets, AlN-complex transition metal carbide or complex transition metal boride composites, AlN-containing solid solution powder or porous bodies of AlN, AlN solid solutions or AlN composites prepared via the process of the first aspect.

A third aspect of the present invention is a composite prepared by infiltrating porous bodies of the second aspect with a polymer or a metal with or without an intermediate step wherein the porous bodies are coated with a silicate material.

A fourth aspect of the present invention is a sintered AlN body prepared from the AlN powder of the second aspect of this invention.

DETAILED DESCRIPTION OF THE INVENTION

As used herein, "low pressure" means a pressure of from 0.75 to 30 atm (0.075 to 3 MPa). The pressure is desirably from 0.75 to 10 atm (0.075 to 1 MPa), preferably from 0.8 to 3 atm (0.08 to 0.3 MPa) and more preferably from 0.9 to 1.2 atm (0.09 to 0.12 MPa). The use of low pressure allows one to avoid a requirement for sophisticated pressure or vacuum equipment.

The term "aluminum alloy" is used herein to refer to metal alloys having an Al content of at least 75 wt %, based upon alloy weight.

The term "particulate" refers collectively to powders, agglomerates, shredded metal foil or sheet having a thickness of from 20 micrometer (μm) to 500 μm, wire and chopped wire having a thickness as high as about 0.06 inch (1000 μm) and granular powder. Although the shredded form is desirable when the Al or Al alloy is supplied as a foil or sheet, the foil and sheet need not be reduced to any particular dimension or even shredded at all.

The term "solid solution" refers to a stable (or metastable) solution of one solid in a second solid. In terms of crystal structure, it refers to a mixed crystal that has a lower free energy than either of two alternatives. One alternative is building up two crystals of different composition. The other alternative is building up a new structure in which foreign atoms are put on ordered sites.

The present invention is directed to variations of a process whereby AlN powder, platelets or porous bodies, or solid solution powders or porous bodies based upon AlN, AlN-complex transition metal carbide or complex transition metal boride composite powders or porous bodies can be prepared by combusting Al or an Al alloy, preferably in powder or particulate form, in nitrogen gas under low pressure. In one variation, the Al or Al alloy is admixed with an inert diluent prior to combustion. In a second variation, a ceramic material or raw material used to form such a ceramic material under process conditions is used in place of the inert diluent. In a third variation, the Al or Al alloy is optionally admixed with carbon, preferably solid, particulate carbon, rather than an inert diluent to produce AlN platelets. In a fourth variation, the Al or Al alloy is admixed with a combination of a first transition metal, a nonmetallic component selected from carbon and boron, and a second transition metal to produce composites of AlN and a transition metal carbide or a transition metal boride. The first and second transition metals are different metals selected from Ti, Zr, Hf, V, Nb, Ta, Cr, Mo and W. The transition metal carbide or boride is in the form of whiskers that contain from ≧50 to <100 atomic percent (At %) of the first transition metal and from >0 to <50 At % of the second transition metal, both percentages being based on metal content of the whiskers. When the second transition metal is vanadium, it is preferably present in a dopant amount. As used herein, the term "dopant amount" means an amount >0 but <10 At % of transition metal, based on metal content of the whiskers. The whiskers have a crystal structure like that of the corresponding carbide or boride of the first transition metal.

Combustion will occur under low nitrogen pressure if bulk density falls within a certain range, particularly if an appropriate amount of an inert diluent is present. If the bulk density is too high, low nitrogen pressure generally leads to incomplete conversion of Al to AlN. If the bulk density is too low, it is difficult, if not impossible, to maintain a combustion wave. If there is insufficient inert diluent present, the Al metal or alloy tends to melt and coalesce into pools that limit access of nitrogen gas to molten Al or Al alloy and leads, in turn, to incomplete conversion of the Al or Al alloy. If there is too much inert diluent, combustion of the Al or Al alloy fails to provide sufficient heat to maintain a combustion wave.

Each of the process variations begins by placing the Al or Al alloy, in admixture, where appropriate, with at least one of (a) an inert diluent, (b) a preformed ceramic powder, (c) raw materials for said ceramic powder, (d) carbon or (e) a combination of two different transition metals and a nonmetallic element that is either carbon or boron, into a suitable container, such as a graphite or refractory oxide crucible. For example, the admixture may contain both an inert diluent, such as AlN, and carbon. If necessary, the bulk density is increased by tapping the container, tamping the container contents or other conventional means. If desired, an igniter such as a cold-pressed pellet of an admixture of 2Ti+3B may be placed on top of the container contents. The container is then placed into a suitable low pressure vessel, such as a stainless steel cylinder. The vessel is purged with nitrogen gas and then pressurized to a preselected low nitrogen pressure suitable for purposes of the intended reaction. The container contents are then ignited, either indirectly via the igniter or directly, by any suitable means such as, for example, a heated tungsten coil, an electric match, a laser or other conventional means. A heated tungsten coil provides satisfactory results. The container contents may also be heated to a temperature suitable for ignition. A typical ignition temperature is 1050° C. (1323 K.). The ignition temperature varies with factors such as synthesis conditions, reactants and reactant forms, but may be readily determined without undue experimentation. After allowing combustion to proceed to completion, the vessel and its contents are cooled and, if necessary, depressurized. The container contents, now a reaction product, are then recovered by conventional procedures.

The admixtures used in the method of the present invention have bulk densities that vary depending upon factors such as the material being prepared, Al or Al alloy content of the admixtures, and the means for ignition, either direct, indirect or by heating to a combustion temperature. For example, direct or indirect ignition of admixtures used to make AlN powder, or AlN solid solutions, AlN composites or porous AlN, AlN composite or AlN solid solution bodies readily occurs when the bulk density is from 0.5 to 1.2 g/cm$^3$, preferably from 0.6 to 1.0 g/cm$^3$, whereas ignition via heating to a combustion temperature is favorable when the bulk density is from 0.5 to 1.5 g/cm$^3$, preferably from 0.6 to 1.1 g/cm$^3$. By way of contrast, when making AlN platelets with carbon rather than an inert diluent, bulk densities that will sustain a combustion reaction may vary from 0.2 to 1.4 g/cm$^3$. Bulk densities suitable for making porous bodies vary from 0.5 to 1.2 g/cm$^3$, preferably from 0.6 to 1.1 g/cm$^3$.

An inert diluent, when used, is desirably in the form of a powder that does not react with Al or otherwise interfere with the nitridation reaction. The diluent is preferably a powdered or particulate nitride such as AlN, $Si_3N_4$, boron nitride (BN), titanium nitride (TiN), hafnium nitride (HfN) or zirconium nitride (ZrN) or any other inert ceramic material. As used herein, the phrase "inert ceramic material" refers to ceramic materials that do not react, or form substantial amounts of a solid solution, with AlN. Other inert ceramic materials include borides such as titanium diboride ($TiB_2$) and carbides such as boron carbide ($B_4C$).

The carbon used in making AlN platelets is desirably a solid, particulate carbon (C). Acetylene carbon black is particularly preferred. The carbon is suitably present in admixture with Al or an Al alloy in an amount of from 5 to 70 wt %, based on admixture weight. The resultant AlN platelets have a size that is suitably from 0.5 to 10 μm thick and 5 to 100 μm wide, preferably from 2 to 4 μm thick and 20 to 30 μm wide.

When preparing composites of AlN and a transition metal carbide or a transition metal boride, the powdered admixtures suitably contain from 10 to 90 parts by weight (pbw) of Al or Al alloy, and from 90 to 10 pbw of a combination of the first and second transition metals and either carbon or boron, all parts being based upon admixture weight and amounts of Al or Al alloy and the combination totals 100 parts. The admixtures preferably contain from 25 to 75 pbw of Al or Al alloy, and from 75 to 25 pbw of the combination. If the first transition metal is Ti and the second transition metal is V, suitable component amounts are as follows: Ti—from 72 to 94 pbw; V—from 0.8 to 9.5 pbw; and B or C—from 5 to 21 pbw, all parts being based upon weight of combination. Preferred component amounts are: Ti—from 73.5 to 79.4 pbw; V—from 1.6 to 6.5 pbw; and B or C—from 19 to 20.1 pbw. If the first transition metal is Zr and the second transition metal is V, suitable component amounts are as follows: Zr—from 82.8–91.4 pbw; V—from 0.5–5.3 pbw; and B or C—from 8.1–12.1 pbw, all parts being based upon weight of combination. Preferred component amounts are: Zr—from 82.8–88.9 pbw; V—from 0.5–5.2 pbw; and B or C—from 10.6–12.1 pbw.

The AlN composite materials contain, as verified by x-ray diffraction (XRD) analysis, AlN and a complex carbide or boride with no detectable amount of residual Al. As used herein, the term "complex carbide or boride" refers to carbides or borides that contain at least two transition metals as transition metals have been defined herein. Scanning electron microscopy (SEM) of the materials shows that they are composed of AlN particles (both equiaxed and platelet form) and complex carbide or boride whiskers. The whiskers have a width or thickness of 0.5 to 5 µm, preferably 1 to 2 µm and a length of 5 to 100 µm, preferably 10 to 60 µm.

An inert diluent, when used, is desirably present in an amount of from 20 to 80 wt %, based upon admixture weight. The amount is preferably from 30 to 70 wt %.

Combustion synthesis in accordance with the present invention desirably converts at least 75 wt % of the Al to AlN. Preferably, at least 90 wt % of the Al in the admixture is converted to AlN. Similarly, a desirable conversion to a solid solution is at least 75 wt % and a preferred conversion is at least 90 wt %.

Preparation of solid solutions of AlN requires either a preformed ceramic material or raw materials that convert to such a ceramic material under reaction conditions. The preformed ceramic material is suitably selected from SiC, $Al_2O_3$, and $SiO_2$. SiC is a preferred ceramic material. Raw materials vary depending upon the ceramic material of choice. For example, a particulate combination of Si and C may be used to make SiC. Combinations of $Si_3N_4$ and $Al_2O_3$, optionally with one or more of SiC and $SiO_2$, also serve as suitable raw materials. Raw material selections for other ceramic materials may be readily determined by skilled artisans without undue experimentation.

The AlN and AlN solid solutions in their various forms and AlN composite materials prepared as described herein are believed to be suitable for a wide variety of end use applications. For example, small particle size and low oxygen content AlN powder may be particularly suitable for electronic applications. Electronic applications include, for example, substrates which have been formed by sintering the AlN powder into a dense body. Other applications of sintered bodies formed with said AlN include applications such as thermal management applications such as heat sinks. In addition, the AlN powder is believed to have a particle size distribution that favors a high packing density and an improved thermal conductivity relative to a narrow particle size distribution in filler applications for polymer materials such as epoxy resins. AlN platelets are also suitable for use in such filler applications or as reinforcing materials for polymers, metals or other ceramics. Although an AlN solid solution powder may result in a lower thermal conductivity than an AlN powder, the solid solution powder is expected to be more hydrolytically stable than the AlN powder. The composites of AlN and a complex transition metal boride or a complex transition metal carbide, once densified by conventional techniques, are suitable for use in applications requiring high thermal conductivity. The whisker reinforcement provided by the complex transition metal borides and carbides enhances fracture toughness of resulting densified bodies.

When sintering the AlN, typically the AlN is first milled forming an AlN powder. Suitable milling techniques include ball milling, planetary ball milling, vibratory milling and jet milling. The AlN powder may contain a concentration of a metal impurity such as iron, chromium, vanadium, aluminum, gallium, nickel, cobalt, copper, zinc and titanium, wherein said metals are typically present in the powder as silicides, borides, or boron silicides. Preferably the metal is iron. The concentration of said metal impurity can be greater than about 10 ppm (parts per million by weight). Preferably the metal impurity concentration is greater than about 100, more preferably greater than about 200, and most preferably greater than about 300 ppm to at most about 20,000, preferably at most about 10,000, more preferably at most 4000 ppm, and most preferably at most 2000 ppm. The metal impurity in the AlN powder is typically present as discreet particulates having a particle diameter less than about 20 microns. The AlN powder can be mixed with an amount of a sintering aid sufficient to promote sintering to a density of at least about 90% of theoretical. Suitable sintering aids include compounds of a rare earth metal, yttrium, alkaline earth metal, boron, or combinations thereof. The sintering aid is preferably an oxide or other compound that can react or decompose to the corresponding oxide, such as a carbonate or boride. More preferably the sintering aid is yttria. The AlN and sintering aid can be mixed dry or in a liquid by the above milling techniques, V-blending, sigma mixing, and ultrasonic agitating. The liquid is preferably a liquid which does not react with the AlN to form an aluminum oxide or aluminum hydroxide such as ethanol. Organic additives known in the art such as dispersants, binders and lubricants may also be added to the mixture during milling and mixing. For example, suitable binders include polyethyloxazoline, industrial waxes such as paraffin, highly viscous polyglycols, polymethylmethacrylate and polyvinyl butyral.

After mixing or milling, the powder or powder mixture is typically shaped into a greenware body. The greenware body can be formed by a method such as extrusion, injection molding, die pressing, isostatic pressing, slip casting, roll compaction or tape casting. If a liquid is used during mixing or milling, the liquid may be removed before shaping into a greenware body by techniques such as spray drying, vacuum drying, freeze drying and fluid bed drying. If an organic additive, such as a binder, is present in the greenware, said greenware is desirably subjected to conditions sufficient to remove a significant portion of said additive. Typically, the binder is removed by heating the greenware in an oxidizing or inert atmosphere to a temperature where the additive or additives volatilize, sublime, decompose or oxidize.

The AlN greenware is then densified by heating in an inert atmosphere such as nitrogen or argon to a temperature, at a pressure and for a time sufficient to substantially densify the greenware. "Substantially dense" herein means a density greater than about 90% of theoretical. The temperature is desirably as low as possible to achieve a desired sintered density. Preferably the temperature is at least 1500°, more preferably at least about 1600°, and most preferably at least about 1650° C. to at most about 2000°, preferably at most about 1900°, and more preferably at most about 1850° C. The pressure is desirably ambient at atmospheric pressure. The time is desirably as short a time as possible sufficient to achieve a desired density. Preferably the time is at most about 72, more preferably at most about 24, and most preferably at most 6 hours to at least 0.5, preferably at least about 1, and more preferably at least about 2 hours.

The AlN sintered body desirably has a density of at least about 90% of theoretical. Preferably the sintered body has a density of at least about 95% and more preferably at least about 98% of theoretical. The sintered body desirably also has a thermal conductivity greater than about 100 W/m-K as determined by a laser flash method. Preferably the thermal conductivity is at least about 120, more preferably at least about 140, and most preferably at least about 150 W/m-K. Surprisingly, the sintered AlN body can achieve a high density and high thermal conductivity while containing a high concentration of a metal impurity such as iron, chromium, nickel, cobalt, copper, zinc and titanium, wherein said metals are typically present in sintered body as silicides, borides, or boron silicides. Preferably the metal is iron. The concentration of said metal impurity can be greater than about 10 ppm (parts per million by weight). Preferably the metal impurity concentration is greater than about 100, more preferably greater than about 200 and most preferably greater than about 300 ppm to at most about 20,000, preferably at most about 10,000, more preferably at most about 4000, and most preferably at most 2000 ppm.

Porous AlN or solid solution bodies, prepared as described herein, are well suited for subsequent infiltration by either polymeric materials or metals. Conventional infiltration procedures are readily adapted for use with the porous bodies. The conventional procedures include, without limitation, mechanical pressing and vacuum infiltration as well as immersion of a porous body in a solution containing a polymer or a molten polymer or metal.

The porous bodies may be infiltrated as produced or, preferably, subsequent to an intermediate coating step. U.S. Pat. No. 5,234,712 teaches applying a coating to AlN powder at column 1, line 46 through column 2, line 37, and column 3, line 36 through column 4, line 54. PCT/US93/00978 (WO 93/25496) at page 5, lines 24–38, modifies this step by repeating the process to apply a second coating. Additional coatings, if desired, can be applied in the same manner. With porous bodies, the forgoing procedure is further modified. Rather than dispersing AlN powder in a nonaqueous solvent during preparation of the coating solution, the coating solution is prepared before being placed in contact with the porous body. A preferred procedure for coating the porous bodies starts by vacuum infiltration of at least a portion of the coating solution into the porous body and concludes by setting or immersing the porous body into any remaining coating solution. The porous body may be left in contact with the coating solution for as long as desired, but suitable results typically require a contact of no more than 2 to 3 hours. The porous body is then placed into an oven, or other suitable, conventional drying apparatus, and heated to dry and cure the coating. When using a coating solution prepared from tetraethylorthosilicate (TEOS), absolute ethanol, deionized water and 1N acetic acid, as described herein, drying and curing suitably occur at a temperature of 120° C. over a period of 0.5–2 hours and is followed immediately by firing at an increased temperature of 550°–600° C. over a period of 0.5–2 hours. There is no need to remove the body from the drying apparatus between drying/curing and firing. One can simply increase the temperature of the drying apparatus from that used in drying/curing to that used in firing. After cooling to ambient temperature, the drying and curing step may be repeated one or more additional times as desired.

U.S. Pat. No. 5,234,712 teaches, at column 3, lines 7–27, linear and branched alkyl and alkoxyalkyl silicates that are suitable for use in preparing coating solutions. The silicates are represented by the following formula:

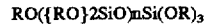

$$RO(\{RO\}_2SiO)_nSi(OR)_3$$

wherein each R is independently selected from alkyl and alkoxyalkyl radicals having from 1 to 12 carbon atoms, inclusive, and n is a number from 0 to 2, inclusive. Independently selected means that each R radical may be the same as, or different from, other R radicals.

U.S. Pat. No. 5,234,712 teaches, at column 3, lines 47–51, that typical coating solutions include an alkyl alcohol having from 1 to 4 carbon atoms, inclusive, as the solvent, the silicate, water and, optionally, a hydrolysis catalyst. Suitable hydrolysis catalysts are identified at column 4, lines 8–18. For purposes of the present invention, particularly satisfactory results are obtained with absolute ethanol as the solvent, TEOS as the silicate, water and acetic acid as the hydrolysis catalyst.

The following examples are solely for purposes of illustration and are not to be construed, by implication or otherwise, as limiting the scope of the present invention. All parts and percentages are by weight unless otherwise specified.

EXAMPLES

Example 1

A 160.0 g powdered admixture of 50 pbw Al (Reynolds Metals Co., HPS-10) and 50 pbw AlN (The Dow Chemical Company, XU 35548.00) was prepared by mixing for 30 minutes in a ball mill with no milling media. The Al, hereinafter "Al-1" had a surface area (SA) of 0.03 m$^2$/g, an oxygen content of 0.17% and a carbon content of 0.07%. The AlN had a SA of 2.7 m$^2$/g, an oxygen content of 0.86%, and a carbon content of 0.01%.

After milling, the mixture was poured into a graphite crucible (6.35 cm in diameter by 8.89 cm in length) and tapped to a bulk density of 0.64 g/cm$^3$. The filled crucible was inserted into a stainless steel reactor. The reactor was evacuated to a vacuum level of 100 Pa and then backfilled with N$_2$ to atmospheric pressure. The evacuation and backfilling procedure was repeated twice.

After completion of the evacuation and backfilling procedure, N$_2$ was introduced at a flow rate of 45 standard liters per minute (slpm) to establish and maintain a slight positive pressure such as 0.01 MPa above atmospheric. The mixture was ignited using a tungsten coil spaced 2 mm above the mixture's upper surface. As soon as the mixture ignited, power to the coil was turned off and a self-propagating combustion wave moved through the mixture without further addition of energy.

Using an optical pyrometer with an approximate spot size of 2 mm, a peak combustion temperature of 1900° C. (2173

K.) was measured at the ignited mixture's top surface. Unless otherwise specified, this technique was also used in subsequent examples. Because the spot size was larger than the combustion wave width, the pyrometer quite probably detected a temperature significantly lower than the actual peak combustion temperature.

Reaction time, measured in elapsed time from ignition to completion of combustion wave movement through the mixture, was 5 minutes (min). After cooling to room temperature (taken as 25° C.), the contents of the crucible were removed for analysis. The contents had a 40.9 g weight gain which approximated a net yield of 98.6% of theoretical. XRD analysis of the contents revealed no traces of unreacted Al and supported a conclusion that the Al was fully converted to AlN. The AlN had an oxygen content, as determined by a LECO analyzer, of 0.3%. SEM showed an average particle size of 10 µm. The AlN had a SA, as determined by Brunauer-Emmett-Teller (BET) analysis, of 0.15 m²/g.

Example 2

Duplicating Example 1, save for preheating the powdered admixture to a temperature of 500° C. (773 K.) for 30 minutes prior to ignition, increased the peak combustion temperature to 2340° C. (2613 K.) and reduced the reaction time to 2.8 min. The weight gain of 40.15 g equated to a yield of 96.8% of theoretical. XRD analysis revealed no unreacted Al. SEM analysis showed an average particle size of 52 µm with some particles being larger than 100 µm. The oxygen content and SA were, respectively, 0.21% and 0.04 m²/g.

A comparison of Examples 1 and 2 shows that preheating the powdered admixture provides a measure of control over product particle size. Other preheat temperatures are expected to provide results in terms of average particle size that are consistent with a trend established by the comparison.

Examples 3-7

Examples 3-7 replicated Example 1 with variations in choice of reactants, bulk density and total amount of reactants. The variations resulted in changes in peak combustion temperature, total reaction time, actual weight gain, equivalent yield and product particle size. The second aluminum source (Al-2, Alcoa 7123) had a specific SA of 0.15 m²/g and an oxygen content of 0.5%. Examples 3-6 used the same AlN as in Example 1. Example 7 used the AlN produced in Example 1. Table I below summarizes relevant reactant and reaction product data. The entry for Example 5 lists two product particle sizes of different color. The product in that example was a friable mass of white crystals with a core (2 cm in diameter) of yellow crystals. XRD analysis revealed no unreacted Al in any of the examples.

TABLE I

| Example No. | Total Reactant Weight (g) | Reactant Bulk Density (g/cc) | Reactants (parts by weight) | | | Peak Combustion Temp (°K.) | Reaction Time (min) | Weight Gain (g) | Theoretical Yield (%) | Average Particle Size (µm) | Surface Area (m²/g) | Oxygen content % | Remarks |
|---|---|---|---|---|---|---|---|---|---|---|---|---|---|
| | | | AlN | Al-1 | Al-2 | | | | | | | | |
| 3 | 186 | 0.74 | 60 | 40 | 0 | 2118 | 6 | 38.4 | 99.5 | 5 | 0.41 | 0.35 | |
| 4 | 148 | 0.59 | 25 | 75 | 0 | 2358 | 4.5 | 56.5 | 98.2 | 50 | 0.04 | 0.20 | |
| 5 | 181.4 | 0.73 | 50 | 0 | 50 | — | 4 | 45.0 | 95.7 | 2 | 0.97 | 0.38 | White |
| | | | | | | | | | | 20 | 0.04 | 0.25 | Yellow |
| 6 | 186.5 | 0.75 | 50 | 25 | 25 | 2388 | 4 | 47.4 | 98.0 | 15 | 0.12 | 0.18 | |
| 7 | 173 | 0.69 | 50 | 50 | 0 | 2193 | 5 | 44.8 | 99.9 | 10 | 0.18 | 0.30 | |

— means not measured

Examples 1-7 demonstrate that substantially complete conversion of Al to AlN via combustion synthesis occurs at one atmosphere of nitrogen when an inert diluent such as AlN is admixed with the Al prior to ignition and the bulk density is kept sufficiently low to sustain a combustion wave. Similar results are expected with other admixtures and operating conditions all of which are disclosed herein.

By way of contrast, duplication of Example 1 save for using Al-1 in place of the admixture of Al-1 and AlN, led to melting of the Al, very little weight gain and substantial amounts of unreacted Al. In addition, duplication of Example 4 save for increasing the amount of material and increasing the bulk density to 1.2 g/cm³ led to localized heating and an absence of a combustion wave. In other words, there was little, if any weight gain.

It is believed that the increase in bulk density when preparing AlN or solid solution powders both increases the thermal conductivity of the admixture and decreases local availability of nitrogen. The combined effect is not conducive to establishing a self-propagating combustion wave. An even greater increase in bulk density with Al-2 alone also yielded very little conversion. Similar results are expected with other combinations of reactants and operating parameters outside those disclosed herein.

Example 8

A 438 g quantity of Al alloy sheet having a thickness of 250 µm was shredded into strips having a width of 3 mm. The Al alloy (Reynolds Metals Co. 3104) contained 97.25 pbw Al, 1.05 pbw magnesium (ME), 1.05 pbw manganese (Mn), 0.45 pbw iron (Fe), and 0.2 pbw Si. The strips were formed into a cylindrical compact having a bulk density of 1.24 g/cm³. The compact was placed into a graphite crucible on top of a 200 g quantity of AlN powder. The AlN powder kept resultant reaction products from sticking to the crucible. The crucible was placed inside a quartz and graphite induction furnace used as a reactor. The reactor was purged with 20 volumes of $N_2$ before establishing a flow rate of 40 slpm. The flow rate maintained a slight positive pressure inside the reactor. The reactor temperature was increased at a rate of 30° C./min (30 K./min) to 1050° C. (1273 K.) after which it was increased at a rate of 10° C./min (10 K./min).

At a temperature of 1150° C. (1323 K.), as measured on the outside of the crucible, an exothermic reaction started and the compact began to increase rapidly in temperature. If a thermocouple had been inserted directly into the powder, a lower temperature, such as 950° C. (1123 K.), might have been detected. The $N_2$ flow rate was varied during the reaction to maintain a slight positive pressure of $N_2$. The maximum flow rate was 80 slpm. The reaction was estimated to be complete in 2 min. The peak temperature measured as in Example 1 was 2225° C. (2498 K.).

After the crucible contents cooled to room temperature, the weight gain was found to be 127.2 g for a yield of 56% of theoretical. XRD revealed no traces of unreacted Al. SEM showed an average product particle size of 20-30 μm.

Example 9

Example 9 duplicated Example 8 save for pouring a 1000 g quantity of the same AlN as in Example 1 over and around a compact formed from 440 g of Al alloy sheet to form a powder bed prior to heating. At a temperature of 1250° C. (1523 K.) (as measured on an outer surface of the AlN surrounding the compact), an exothermic reaction was detected. The peak temperature was 1500° C. (1773 K.). The reaction time was 2 min. The weight gain of 220 g equated to a yield of 97.3% of theoretical. XRD analysis revealed no detectable unreacted Al. SEM showed that most of the product had a particle size of 20-30 μm. The powder bed proximate to the compact contained a product having a size of 5 μm.

It is believed that the powder bed served to capture Al and AlN vapors produced during the combustion reaction. This serves as a potential explanation for the increase in yield over Example 8.

Example 10

A 500 g quantity of 50 pbw of the same Al alloy as in Example 8 and 50 pbw of the same AlN as in Example 1 was converted into a cylindrical compact by compacting alternating layers of Al alloy and AlN. Each layer had a thickness of 3 mm. The compact had a density of 1.4 g/cm³. The compact was heated to initiate a reaction as in Example 8. An exothermic reaction was detected at 1175° C. (1448 K.). The peak temperature was 1900° C. (2173 K.). The reaction time was 2 min. The weight gain of 87.2 g equated to a yield of 67.3% of theoretical. XRD analysis revealed no detectable unreacted Al. SEM showed that most of the product had a particle size of 4-6 μm.

Example 11

A 260 g quantity of Al alloy sheet having a thickness of 500 μm was converted into a cylindrical compact as in Example 8. The Al alloy (Reynolds Metals Co. 5182) contained 94 pbw Al, 4.5 pbw Mg, 0.4 pbw Mn, 0.1 pbw Fe, and 0.1 pbw Si. The compact had a bulk density of 0.64 g/cm³.

The compact reacted as in Example 9 to provide an exotherm at 1250° C. (1523 K.) and a peak temperature of 1400° C. (1673 K.). The $N_2$ flow rate was 50 slpm and the reaction time was 5 min. The weight gain of 126.6 g equated to a yield of 93.2% of theoretical, based upon pure Al. The yield was 97.5% of theoretical if corrected to account for 4.5% Mg, a metal that very probably volatilized during the reaction. XRD analysis revealed no detectable unreacted Al. SEM showed that most of the product had a particle size of 10 μm.

Example 12

Example 12 duplicated Example 10 save for using a 459.5 g quantity of 50 pbw Al alloy sheet having a thickness of 20 μm and 50 pbw AlN. The Al alloy (Reynolds Metals Co. 8111) contained 99.1 pbw Al, 0.5 pbw Fe, 0.3 pbw Si and 0.1 pbw zinc (Zn). An exotherm was detected at 1250° C. (1523 K.) and the peak temperature was 2200° C. (2473 K.). The reaction time was 3 min. The weight gain of 117.5 g equated to a yield of 98.6% of theoretical. XRD analysis revealed no detectable unreacted Al. SEM showed that most of the product had a particle size of 10 μm.

Example 13

A 1000 g quantity of the same 50/50 Al/AlN admixture as in Example 1 was loosely poured into a graphite crucible that contained a powder bed of 400 g of AlN. The admixture had a bulk density of 0.6 g/cm³ and was heated using the heating schedule of Example 8. An exotherm was detected at 1020° C. (1293 K.) and the peak temperature was 2000° C. (2273 K.). The reaction time was 3.5 min and the maximum $N_2$ flow rate was 80 slpm. The weight gain of 255.4 g equated to a yield of 98.5% of theoretical. XRD analysis revealed no detectable unreacted Al. SEM showed that most of the product has a particle size of 10 μm.

Example 14

Example 14 duplicated Example 13 save for using an 800 g quantity of a 25/75 Al/AlN admixture. An exotherm was detected at 1100° C. (1383 K.) and the peak temperature was 1700° C. (1973 K.). The reaction time was 3.8 min and the maximum $N_2$ flow rate was 50 slpm. The weight gain was 98.5 g for a yield of 95% of theoretical. XRD analysis revealed no detectable unreacted Al. SEM showed that most of the product had a particle size of 5 μm.

Examples 8-14 demonstrate the viability of combustion synthesis that is initiated by heating an entire compact to an ignition temperature. Similar results are expected with other admixtures and process conditions, all of which are disclosed herein.

Example 15

A 213 g admixture of 50 pbw of the same Al as used in Example 1 and 50 pbw SiC (Superior Graphite) was prepared by ball milling as in Example 1. The SiC was predominantly β-SiC and had an average particle size of 0.2 μm and a SA of 20 m²/g. The admixture, when poured into a 7.6 cm diameter graphite crucible, had a bulk density of 0.85 g/cm³. The crucible was placed into the stainless steel reactor, as in Example 1, that was purged with $N_2$ for 30 minutes at a flow rate of 40 slpm.

A tungsten coil placed 0.3 cm from the admixture's upper surface ignited the admixture. The combustion wave reached the crucible bottom in 3.5 min. The weight gain of 53.5 g equaled a yield of 96.9% of theoretical. XRD analysis revealed a single phase AlN-SiC solid solution.

Examples 16-25

A series of experiments were conducted using the procedure of Example 15 with varying ratios of Al, SiC, silicon (Si) (Elkem HQ-SILGRAIN™), carbon (C) (Chevron SHAWINIGAN™), and AlN. The ratios, product SiC content and % yield are shown in Table II below. All Examples produced a single phase AlN-SiC solid solution.

Similar results are expected with other solid solution components and process conditions all of which are disclosed herein.

TABLE II

| Example Number | Raw Materials (parts by weight) | | | | | Product | |
|---|---|---|---|---|---|---|---|
| | Al | Si | C | SiC | AlN | % SiC | % Theoretical Yield |
| 16 | 50 | 3.5 | 1.5 | 0 | 45 | 4.0 | 95.6 |
| 17 | 50 | 7 | 3 | 0 | 40 | 7.9 | 96.5 |
| 18 | 50 | 14 | 6 | 0 | 30 | 15.9 | 98.0 |
| 19 | 50 | 21 | 9 | 0 | 20 | 23.8 | 97.4 |
| 20 | 50 | 28 | 12 | 0 | 10 | 31.8 | 96.5 |
| 21 | 50 | 0 | 0 | 5 | 45 | 4.0 | 95.6 |
| 22 | 50 | 0 | 0 | 10 | 40 | 7.9 | 96.0 |
| 23 | 50 | 0 | 0 | 20 | 30 | 15.9 | 98.5 |
| 24 | 50 | 0 | 0 | 30 | 20 | 23.8 | 97.5 |
| 25 | 50 | 0 | 0 | 40 | 10 | 31.8 | 97.9 |

Example 26

In order to evaluate hydrolytic stability of AlN-SiC solid solutions, the products of Examples 16–20 were subjected to a temperature of 85° C. (358 K.) and a relative humidity of 85% for a period of 100 hours. The Sample Number, the SiC content and the % weight gain are shown in Table III below.

TABLE III

| Sample Designation | Table I Example No. | SiC Content (Weight %) | Weight Gain (Weight %) |
|---|---|---|---|
| A | 16 | 4.0 | 1.70 |
| B | 17 | 7.9 | 0.50 |
| C | 18 | 15.9 | 0.25 |
| D | 19 | 23.8 | 0.10 |
| E | 20 | 31.8 | 0.05 |

The data presented in Table III demonstrate substantial hydrolytic stability for the AlN-SiC solid solutions. This point is reinforced by the observation that pure AlN powder, when subjected to the same conditions, exhibits a much greater weight gain. Similar results are expected with other solid solutions containing AlN and a ceramic material other than SiC as disclosed herein.

Example 27

Example 27 duplicated Example 1 save for increasing the size of the crucible and using 1200 g of a powdered admixture of 35 pbw Al-2 and 65 pbw of AlN prepared as in Example 1. In addition, the AlN was ball milled to a SA of 1.8 m² per gram prior to ball milling as in Example 1. The crucible had a diameter of 17.8 cm and a length of 15.2 cm. The bulk density was 0.61 g/cm³. The peak combustion temperature, reaction time and weight gain were, respectively, 1735° C. (2008 K.), 5 min and 212.2 g. The yield was 97.4% of theoretical. XRD analysis revealed no unreacted Al. The average product particle size (SEM) was 1 μm. The surface area and oxygen content were, respectively, 2.4 m²/g and 0.35%.

The product sintered via conventional liquid phase sintering procedures to a density of greater than 99 percent of theoretical to provide a sintered body with a thermal conductivity of greater than 170 watts/meter-K (W/m-K). Similar results are expected by sintering products resulting from Examples 1–14 as well as other admixtures and operating conditions, all of which are disclosed herein.

Example 28

A 1000 g powdered admixture of 50 pbw Al-2 and 50 pbw of the AlN produced in Example 27 was poured into a crucible like that in Example 27. After tapping the admixture to a bulk density of 0.62 g/cm³, an additional 1500 g quantity of the admixture was prepared and placed into a variable speed feeder.

The feeder had a conical shape with a volume of 3 liters. Its tip or small end was equipped with a screen having a diameter of 7 cm. The screen was 12 mesh (1.40 mm screen openings). A bladed spindle that was connected to a variable speed motor was disposed inside the feeder in such a manner that it operated in the same manner as a flour sifter when the motor was running. By varying the speed of the motor, one could control the rate at which the powdered admixture was fed to the crucible.

After placing the crucible and the feeder into the same stainless steel reactor as in Example 1, the reactor was evacuated and backfilled with $N_2$ gas, also as in Example 1, before introducing $N_2$ gas at a flow rate of 80 slpm to establish and maintain a slight positive pressure. Three minutes after igniting the admixture in the crucible, the additional admixture in the feeder was added to the crucible at a rate of 100 g/min. A total reaction time of about 20 minutes produced a weight gain of 638.4 g for a yield of 98.5% of theoretical. The product was quite similar to that of Example 27. It had an average particle size of 1 μm, a SA of 2.8 m²/g and an oxygen content of 0.54%.

Example 29

A 200 g quantity of the same 50/50 Al/AlN admixture as in Example 1 was added to the feeder described in Example 28. The admixture was fed into a heated graphite crucible at a rate of 2 g/min. The crucible was placed inside the induction furnace described in Example 8 and heated to a temperature of 1100° C. (1373 K.) prior to addition of the admixture. As in several examples, such as Examples 1 and 8, a slight positive pressure of nitrogen was maintained inside the furnace.

After feeding 30 g of the admixture to the crucible, the crucible and its contents were allowed to cool to room temperature (25° C. or 298 K.). XRD revealed no traces of unreacted Al. SEM showed an average product particle size of 1 μm.

Example 30

The furnace described in Example 8 was fitted with a graphite crucible lined with AlN plates having a thickness of 0.5 inch (1.3 cm). The lined crucible had a volume defined by a diameter of 13 cm and a length of 16 cm. The crucible was placed at an angle of 22.5 degrees with respect to horizontal and attached to a graphite shaft. The shaft was, in turn, operatively connected to a motor drive to allow the crucible to be rotated as material contained therein or added thereto reacted. The crucible had ⅓ of its volume occupied by AlN balls having a diameter of 1.3 cm. The crucible rotated at about 6 revolutions per minute (rpm).

The crucible was rotated and heated to a temperature of 1300° C. (1573 K.) under a flowing nitrogen atmosphere that established a slight positive pressure as in Example 1. The rotating crucible was maintained at 1300° C. (1573 K.) for a period of 15 minutes before Al wire (Alcoa, 99.99% pure) having a diameter of 0.16 cm was fed into the center of the crucible. A metal inert gas (MIG) welding wire feeder fed the wire through a water cooled lance and insulated $Al_2O_3$ tube at a rate of 38 to 100 cm per minute (2 to 5 g per minute).

As the wire or molten Al contacted the AlN balls, combustion synthesis of AlN took place and bright flashes of light could be seen inside the crucible. XRD revealed no traces of unreacted Al. SEM showed an average product particle size of 2 to 3 μm.

Examples 28–30 demonstrate the viability of combustion synthesis on a semicontinuous or continuous basis. Similar results are expected with other starting materials and operating conditions, all of which are disclosed herein.

Example 31

A 200 g quantity of an admixture of 90 pbw Al-2 and 10 pbw of C powder (Chevron Acetylene Black) was loosely poured into a graphite crucible. The admixture had a bulk density of 0.7 g/cm$^3$. The crucible was inserted into a stainless steel reactor vessel so that its top surface was 3 mm from a tungsten coil used for ignition. The reactor vessel was evacuated and backfilled twice as in Example 1. The admixture was ignited by running a current of 70 amperes through the tungsten coil for 5 seconds. The admixture burned for 5 minutes and yielded a product having a weight gain of 74.7 g, equivalent to a yield of 80% of theoretical. XRD analysis of the product showed that it was composed of AlN and a trace of Al$_4$C$_3$. SEM showed that most of the product was in the form of AlN platelets having a thickness ranging from 2 to 4 μm and a width of 20 to 30 μm.

Example 32

Example 31 was replicated save for varying the amounts of Al, either Al-1 or Al-2 and carbon powder and, in some instances, substituting an amount of AlN for an equal weight of Al-2. Table IV shows the Sample Number, composition, powder bulk density, yield (where measured) and, in some instances, qualitative observations on resulting product.

The results in Example 31 and Table IV demonstrate that combustion synthesis of admixtures having a carbon content of from 5 to 70 wt %, based on admixture weight, yields a satisfactory AlN reaction product. The bulk densities of such admixtures ranged from 0.2 g/cm$^3$ to less than 1.3 g/cm$^3$. In addition, the combustion reaction was still sustainable with yields as low as 12% of theoretical.

TABLE IV

| Ex- ample | Al Source | % Al | % C | % AlN | Density (g/cm3) | Yield (% of theoretical | Morphology Description |
| --- | --- | --- | --- | --- | --- | --- | --- |
| A | Al-2 | 90 | 10 | 0 | 0.75 | — | Large (5 × 50 μm) platelets |
| B | Al-2 | 90 | 5 | 5 | 0.70 | — | Fine (1–2 μm) equiaxed |
| C | Al-1 | 80 | 10 | 10 | 0.40 | — | Large (4 × 40 μm) platelets |
| D | Al-1 | 85 | 5 | 10 | 0.50 | — | Fine (1–3 μm) equiaxed |
| E | Al-1 | 85 | 10 | 5 | 0.60 | — | Mixture of large and small platelets (1 × 10 μm and 5 × 50 μm) |
| F | Al-1 | 90 | 5 | 5 | 0.42 | — | Mixture of platelets and equiaxed crystals |
| G* | Al-2 | 95 | 5 | 0 | 0.83 | 0 | — |
| H* | Al-2 | 95 | 5 | 0 | 0.76 | 0 | — |
| I | Al-2 | 90 | 10 | 0 | 0.70 | 68 | — |
| J | Al-2 | 90 | 10 | 0 | 0.92 | 68 | Large (4 × 60 μm) platelets |
| K | Al-2 | 90 | 10 | 0 | 1.18 | 29 | — |
| L* | Al-2 | 95 | 5 | 0 | 0.80 | 0 | — |
| M | Al-2 | 35 | 65 | 0 | 0.21 | 30 | — |
| N | Al-2 | 35 | 65 | 0 | 0.18 | 12 | — |
| O | Al-2 | 50 | 50 | 0 | 0.26 | 68 | — |
| P | Al-2 | 70 | 30 | 0 | 0.32 | 72 | — |
| Q | Al-2 | 70 | 30 | 0 | 0.50 | 66 | Small (0.6 × 10 μm) platelets |
| R | Al-2 | 70 | 30 | 0 | 0.73 | 51 | — |
| S | Al-2 | 50 | 50 | 0 | 0.39 | 83 | Small (1 × 10 μm) platelets |
| T | Al-2 | 50 | 50 | 0 | 0.49 | 76 | — |
| U | Al-2 | 35 | 65 | 0 | 0.40 | 96 | Mixture of small (1 × 10 μm) platelets and fine (103 μm) equiaxed crystals |
| V | Al-2 | 50 | 50 | 0 | 0.53 | 68 | — |

\* = Not an Example of the Invention; — = not measured

Example 33

A 200 g quantity of an admixture of 50 pbw Al-2 and 50 pbw of a combination (75.8 pbw Ti powder (Johnson Mathey), 4.2 pbw V powder (Johnson Mathey) and 20 pbw of the same carbon powder as in Example 31) was ball milled with tungsten carbide-cobalt media for 15 minutes. The admixture was then processed in the same manner as the admixture in Example 31. The admixture burned for 4 minutes to yield a product having a weight gain of 51 g that correlated to a yield of 98.4% of theoretical based upon total conversion of Al to AlN. XRD analysis of the product showed that it was composed of AlN and Ti—V carbide (TiC crystal structure) with no detectable residual Al. SEM showed that the product was in the form of AlN particles (both equiaxed and in platelet form) and complex (Ti—V) carbide whiskers. The whiskers had a width of 1–2 μm and a length of 10–60 μm.

Example 34

Example 33 was duplicated save for changing the relative amounts of Al-2 and the combination and varying the composition of the combination. In addition, the admixture was tapped to a bulk density of 0.8 g/cm$^3$ prior to further processing. The admixture contained 70 pbw Al-2 and 30 pbw of a combination (65.3 pbw Ti powder, 3.7 pbw V powder and 31 pbw of boron (B) powder (Aldrich). The admixture burned for 4.5 minutes to yield a product having a weight gain of 70.1 g that correlated to a yield of 96.5% of theoretical based upon total conversion of Al to AlN. XRD analysis of the product showed that it was composed of AlN and Ti—V boride (TiB$_2$ crystal structure) with no detectable residual Al. SEM showed that the product was in the form of AlN particles (equiaxed with a diameter of 2–4 μm) and complex (Ti—V) boride whiskers. The whiskers had a width of 3–4 μm and a length of 40–70 μm.

Example 35

Example 34 was duplicated save for the relative amounts of Al-2 and the combination to 30 pbw Al-2 and 70 pbw of the same combination as in Example 34. The admixture was tapped to a bulk density of 1.0 g/cm$^3$. It burned for 5.5 minutes to yield a product having a weight gain of 30.8 g that correlated to a yield of 99% of theoretical based upon total conversion of Al to AlN. XRD analysis of the product showed that it was composed of AlN and Ti—V boride (TiB$_2$ crystal structure) with no detectable residual Al. SEM showed that the product was in the form of AlN particles (equiaxed with a diameter of 1–2 μm) and complex (Ti—V) boride whiskers. The whiskers had a width of 1–2 μm and a length of 10–40 μm.

Example 36

Example 32 was duplicated save for varying the composition of the combination. The combination contained 72.7 pbw Zr powder (Aldrich), 8.2 pbw of Nb powder (Johnson Mathey) and 19.1 pbw of the same B powder as used in Example 34. The admixture was tapped to a bulk density of 0.8 g/cm$^3$. It burned for 4 minutes to yield a product having a weight gain of 50.8 g that correlated to a yield of 98% of theoretical based upon total conversion of Al to AlN. XRD analysis of the product showed that it was composed of AlN and Zr—Nb boride (ZrB$_2$ crystal structure) with no detectable residual Al. SEM showed that the product was in the form of AlN particles (equiaxed with a diameter of 2–3 μm) and complex (Zr—Nb) boride whiskers. The whiskers had a width of 1–2 μm and a length of 20–50 μm.

Example 37

Example 32 was duplicated save for varying the composition of the combination. The combination contained 71.6 pbw Ta powder (Aldrich), 18.9 pbw of Ti powder (Johnson Mathey) and 9.5 pbw of the same C powder as used in Example 32. On an At % basis, this was a 50/50 mix of Ti and Ta. The admixture was tapped to a bulk density of 1.4 g/cm$^3$. It burned for 5 minutes to yield a product having a weight gain of 51 g that correlated to a yield of 98.4% of theoretical based upon total conversion of Al to AlN. XRD analysis of the product showed that it was composed of AlN and Ta—Ti carbide (TiC crystal structure) with no detectable residual Al. SEM showed that the product was in the form of AlN particles (equiaxed and platelets with a diameter of 2–3 μm) and complex (Ta—Ti) carbide whiskers. The whiskers had a width of 1–3 μm and a length of 10–100 μm.

Similar results are expected with other combinations of Al or Al alloy, transition metals, and boron or carbon powder. Appropriate amounts of each component of the admixture are disclosed herein.

Example 38

A 265 g quantity of an admixture of 50 pbw Al-2 and 50 pbw of AlN prepared as in Example 1 was mixed for 30 minutes in a ball mill with no milling media. The admixture was then poured into a graphite crucible as in Example 31, tapped to a bulk density of 0.9 g/cm$^3$ and then processed in the same manner as the admixture in Example 31 save for having the tungsten coil spaced 2 mm above the admixture's upper surface. The admixture burned for 5 minutes to yield a product having a weight gain of 67.4 g that correlated to a yield of 98.1% of theoretical based upon total conversion of Al to AlN. XRD analysis of the product revealed no detectable residual Al. The product was in the form of a porous solid having a bulk density, measured geometrically, of 2.1 g/cm$^3$. As used herein, geometric measurement means that a rectangular solid was cut out of, or removed from, the reaction product, measured to determine its external dimensions and weighed to provide data from which the density was calculated. The product was too porous to use an immersion technique to measure density. This equated to a density of 64.4% of theoretical density. A series of sections were cut from the product. One of the sections was measured for thermal conductivity via the laser flash method. The thermal conductivity was 14 W/m-K.

Example 39

Example 38 was duplicated save for increasing the amount of admixture to 280 g and the admixture bulk density to 1.1 g/cm$^3$. The product had a weight gain of 70.4 g that correlated to a yield of 97% of theoretical. The product had a bulk density of 2.3 g/cm$^3$ and a thermal conductivity of 15.6 W/m-K.

Example 40

Example 39 was duplicated save for changing admixture component ratios to 60 pbw Al-2 and 40 pbw AlN. The admixture had a bulk density of 1.0 g/cm$^3$. The product had a weight gain of 85.8 g that correlated to a yield of 98.5% of theoretical. The product had a bulk density of 1.4 g/cm$^3$ and a thermal conductivity of 16 W/m-K.

Example 41

Example 40 was duplicated save for preheating the admixture to a temperature of 600° C. prior to ignition. The product had a weight gain of 82 g that correlated to a yield of 94.2% of theoretical. The product had a bulk density of 1.5 g/cm$^3$ and a thermal conductivity of 23 W/m-K.

Example 42

Four sections of the porous solid prepared in Example 38 were filled with polymers. Two (samples A and B) were filled with an epoxy resin (Duro™ Master Mend™ Epoxy (resin and hardener) quick set formulation, Loctite Corporation) and two (samples C and D) were filled with a silicone polymer (GE Clear Silicone Bathroom Tub & Tile Sealant), a product made in Canada for GE Silicones, General Electric Company). One of each polymer was filled by a mechanical pressing method and one of each was filled by vacuum infiltration. Thermal conductivity measurements of the filled sections, taken without removing excess polymer from outer surfaces of the sections, were as follows: A=10.8 W/m-K; B=13.9 W/m-K; C=10.0 W/m-K; and D=14.3 W/m-K. Thermal conductivity measurements of the polymers themselves were about 0.2 W/m.K for each of the polymers.

The mechanical pressing method involved placing the porous solid in a metal uniaxial die, adding the desired polymer onto the top of the porous solid and applying pressure with a ram until such time as the polymer began to escape through gaps between the ram and walls of the die. The applied pressure was then released; and the part was removed from the die and allowed to air dry overnight (15 hours).

The vacuum infiltration involved diluting the polymer with 10 to 200 volume percent of organic solvent (such as acetone, methyl ethyl ketone or toluene) to produce a reduced viscosity polymer source. The porous solid was attached to a Tygon™ brand hose that was connected, in turn, to a vacuum pump by way of an Erlenmeyer filter flask that served as a trap to prevent the intake of organic materials into the pump. The porous solid was held in place by the vacuum and allowed to come into contact with the surface of the reduced viscosity polymer source. The amount of solvent (diluent) could be adjusted to control the rate of passage of the reduced viscosity polymer source through the porous solid. Once infiltration of the polymer source was complete, as evidenced by the presence of some of the polymer source in the Erlenmeyer filter flask, the vacuum pump was turned off. The infiltrated solid was allowed to air dry overnight as in the mechanical pressing method.

The thermal conductivity measurements for Samples A–D are believed to represent lower limits. Cleaning excess polymers from the surfaces is believed to lead to an increase, however small, in the thermal conductivity. Similar results are expected with other polymers conventionally used in electronic applications.

Example 43

Two sections of the porous solid prepared in Example 38 were bonded together using a polyurethane adhesive (Urethane Bond, Dow Corning Corporation). A thin ($\leq 5$ mm) layer of the adhesive was also spread over outer surfaces of the bonded sections. The adhesive was allowed to dry overnight (15 hours). The bonded sections had a thermal conductivity of 11.1W/m-K. An examination of the outer surfaces of the bonded sections by optical microscopy showed that the coating of urethane was continuous and uniform.

Similar results are expected with other urethane polymers. Similar results are also expected with coatings formed from polymers other than urethanes.

Example 44

A porous body prepared as in Example 31 was treated with TEOS using the modified procedure described herein. A coating solution was prepared by dissolving 1 milliliter (ml) of TEOS in a solution of 10 ml of absolute ethanol, 1 ml deionized (DI) water and 0.1 ml 1N acetic acid. The porous body had a mass, prior to coating, of 2.88 g.

Using the vacuum infiltration apparatus described in Example 42, internal surfaces of the porous body were at least partially coated with the coating solution. The porous body was then immersed in remaining coating solution until all volatile liquid evaporated from the solution. Evaporation was complete three hours after the porous body was placed in the solution. It was believed that the partial coating facilitated further infiltration or "wicking" of the coating solution into the porous body.

After all liquid had evaporated from the solution, the porous body was placed into an oven heated to a set temperature of 120° C. and dried for a period of 1–2 hours. The set temperature was then increased to a temperature of 550°–600° C. and maintained at that temperature for 1 hour. After cooling to ambient temperature, the coating and heating process was repeated to provide a double coating.

The double coated porous body had a thermal diffusivity (laser flash method) of 0.067 cm²/second. This corresponded to a thermal conductivity of at least 15 W/m-K.

The double coated porous body was evaluated by electron probe analysis (EPA). EPA indicated the presence of Si-containing species throughout the porous body, with a greater concentration of Si species within 300 μm of the body's outer surface than throughout the remainder of the body.

Similar results are expected with other porous bodies prepared as described herein as well as with other silicate coatings also described herein. The coated porous bodies may be infiltrated either with polymers, as in Example 42, or with metals. The silicate coating provides a surface that is modified with amorphous silica. The silica provides benefits such as improved hydrolytic stability and a surface chemistry that is compatible with resins and metals traditionally used with silica bodies and particles.

Example 45

A 20.3 Kg powdered admixture of 50 pbw Al (Reynolds Metals Co., HPS-10) and 50 pbw AlN (The Dow Chemical Company, XU 35548.00) was prepared by mixing for 15 minutes in a V-blender containing an intensifier bar. The Al, "Al-1" had a surface area (SA) of 0.03 m²/g, an oxygen content of 0.17% and a carbon content of 0.07%. The AlN had a SA of 2.7 m²/g, an oxygen content of 0.86%, and a carbon content of 0.01%.

After blending, the mixture was poured into a graphite boat (61 cm long by 30.5 cm wide by 15.3 cm deep) and tapped to a bulk density of 0.72 g/cm³. The filled boat was inserted into a stainless steel reactor. The reactor was evacuated to a vacuum level of about 3500 Pa and then backfilled with $N_2$ to atmospheric pressure. The evacuation and backfilling procedure was repeated twice.

After completion of the evacuation and backfilling procedure, $N_2$ was flowed to establish and maintain a slight positive pressure such as 0.01 MPa above atmospheric. The mixture was ignited using a tungsten coil spaced 2 mm above the mixture's upper surface. As soon as the mixture ignited, power to the coil was turned off and a self-propagating combustion wave moved through the mixture without further addition of energy.

Reaction time, measured in elapsed time from ignition to a time when no nitrogen was further consumed in the reaction, was about 28 minutes. After cooling to room temperature (taken as 25° C.), the contents of the boat were removed for analysis. The contents had a 5.15 kg weight gain which approximated a net yield of 97.2% of theoretical.

The product was removed from the graphite boat, subsequently crushed in a jaw crusher, milled in an alumina lined ball mill using 1.3 cm diameter alumina milling media and finally jet milled. The milled AlN had an oxygen content, as determined by a LECO analyzer, of 0.94%. The milled AlN had a carbon content, as determined by a LECO analyzer, of 0.05%. The milled AlN had a SA, as determined by Brunauer-Emmett-Teller (BET) analysis, of 2.13 m²/g. The milled AlN had an iron content of 1300 pm (parts per million by weight), silicon content of 800 ppm, and a calcium content of 56 ppm as determined by X-ray fluorescence. The milled AlN particle size distribution, as determined by Laser light diffraction, was 10% of the particles by weight less than 0.59 (μm), 50% of the particles by weight less than 2.90 (μm) and 90% of the particles by weight less than 8.81 (μm). The AlN milled powder had a metal aluminum content of about 0.135% as determined by acid digestion.

Sintered bodies were prepared by forming shaped bodies (disks) from an admixture of 97 pbw of milled AlN powder and 3 pbw of 99.99% yttria using 6.7 pbw binder. The binder contains 33 pbw polyethyloxazoline and 67 pbw polyethylene glycol (molecular weight 3350). The binder and powder are intimately mixed in ethanol and subsequently dried forming the admixture. The admixture is formed into 2.2 cm diameter disks by application of 6.9 MPa of pressure in an uniaxial die. The binder is removed by heating and cooling at a rate of 2° C./min in air to a temperature of 550° C. The 550° C. temperature is maintained for 1 hour before cooling. The disks are then sintered in a boron nitride crucible at 1825° C. for 3 hours. The heating rate was 10° C./min to 1200° C., 1200° C. maintained for 1 hour, and then 2.5° C./min to 1825° C. The cooling rate was 7° C./min to 1500° C. and subsequently about 10° C./min to room temperature. The sintered AlN bodies had densities greater than about 98% of theoretical and thermal conductivities ranging from 137 to 145 W/m-K as determined by a Laser flash method.

Example 46

Using the AlN milled powder of Example 45, sintered bodies are prepared by the same method described in Example 46 except that the binder was removed in a nitrogen atmosphere. The sintered bodies had densities greater than about 98% of theoretical and thermal conductivities ranging from 156 to 159 W/M-K.

Examples 1–46 demonstrate the versatility of the processes disclosed herein. For example, the processes yield products with a broad variety of powder characteristics, particularly in terms of average particle size and oxygen content. Similar results are expected without undue experimentation using other process variations as disclosed herein, whether on a similar scale or on a larger scale.

What is claimed is:

1. Aluminum nitride platelets, prepared by combustion synthesis comprising:

a) igniting, in the presence of gaseous nitrogen at a pressure of from 0.75 to 30 atmospheres (0.075 to 3 MPa), a particulate material that is a metal selected from aluminum and aluminum alloys in admixture with carbon and b) allowing the combustion wave to pass through substantially all of the admixture to convert at least 10 percent by weight of the aluminum in the particulate material to aluminum nitride.

2. A sintered AlN body formed by sintering, an aluminum nitride powder prepared by a method comprising, a) igniting, in the presence of gaseous nitrogen at a pressure of from 0.75 to 30 atmospheres (0.075 to 3 MPa), a particulate material that is a metal selected from aluminum and aluminum alloys, optionally in admixture with an inert solid diluent, the particulate material having a bulk density and an aluminum metal content sufficient to establish and maintain a self-propagating combustion wave that passes through the admixture and b) allowing the combustion wave to pass through substantially all of the admixture to convert the aluminum in the particulate material to aluminum nitride powder, in an inert atmosphere at a temperature and pressure sufficient to densify the aluminum nitride powder to form the AlN sintered body, said body having a density of at least about 98% of theoretical, thermal conductivity of at least about 100 W/m-K and metal impurity concentration of at least about 200 ppm to at most about 20,000 ppm by weight, wherein the metal impurity is in the form of a metal silicide, a metal boride, or a metal boron silicide.

3. The AlN sintered body of claim 2 wherein the sintered body has a metal impurity concentration of at least about 200 ppm but less than about 10,000 ppm.

4. The AlN sintered body of claim 3 wherein the metal impurity is iron.

5. The sintered AlN body of claim 2 wherein the AlN body contains a compound of a rare earth metal, yttrium, alkaline earth metal, boron or combination thereof.

6. The sintered body of claim 5 wherein the compound is an oxide.

* * * * *